(12) United States Patent
Nishina

(10) Patent No.: US 12,447,623 B2
(45) Date of Patent: Oct. 21, 2025

(54) SETTINGS SUPPORT DEVICE, SETTINGS SUPPORT METHOD, AND PROGRAM

(71) Applicant: OMRON Corporation, Kyoto (JP)

(72) Inventor: Yuki Nishina, Ikoma (JP)

(73) Assignee: OMRON CORPORATION, Kyoto (JP)

( * ) Notice: Subject to any disclaimer, the term of this patent is extended or adjusted under 35 U.S.C. 154(b) by 366 days.

(21) Appl. No.: 17/272,680

(22) PCT Filed: Mar. 15, 2019

(86) PCT No.: PCT/JP2019/010980
§ 371 (c)(1),
(2) Date: Mar. 2, 2021

(87) PCT Pub. No.: WO2020/188661
PCT Pub. Date: Sep. 24, 2020

(65) Prior Publication Data
US 2022/0347850 A1    Nov. 3, 2022

(51) Int. Cl.
*B25J 9/16* (2006.01)
(52) U.S. Cl.
CPC ......... *B25J 9/1689* (2013.01); *B25J 9/1612* (2013.01); *G05B 2219/39001* (2013.01); *G05B 2219/39536* (2013.01)
(58) Field of Classification Search
CPC ...... B25J 9/1689; B25J 9/1612; B25J 9/1671; G05B 2219/39001; G05B 2219/39536; G05B 19/42
See application file for complete search history.

(56) References Cited

U.S. PATENT DOCUMENTS

| 8,781,629 B2* | 7/2014 | Ota | B25J 9/1671 |
| | | | 700/258 |
| 2001/0017012 A1* | 8/2001 | Wiesener | A01M 29/32 |
| | | | 52/101 |

(Continued)

FOREIGN PATENT DOCUMENTS

| CN | 104111047 A | 10/2014 |
| EP | 1453433 A1 | 9/2004 |

(Continued)

OTHER PUBLICATIONS

Extended European Search Report issued in European Appln. No. 19919817.7 mailed Feb. 22, 2022.

(Continued)

*Primary Examiner* — Masud Ahmed
(74) *Attorney, Agent, or Firm* — ROSSI, KIMMS & McDOWELL LLP

(57) ABSTRACT

A technique allows efficient registration of an accurate gripping position of a robot hand with an auxiliary view appearing on a screen in accordance with the robot hand. A user selects a hand type to be used in gripping a gripping target and designates an auxiliary view to be rendered in accordance with the hand. In response to a two-finger hand being selected (step S11), a plane (step S13), a cylinder (step S14), or a rectangular prism (step S15) is rendered based on the view designated by the user (step S12). In response to a suction hand being selected, a plane is rendered (step S16).

13 Claims, 13 Drawing Sheets

(56) References Cited

U.S. PATENT DOCUMENTS

| | | | | |
|---|---|---|---|---|
| 2003/0114862 | A1* | 6/2003 | Chu | A61B 90/11 606/130 |
| 2009/0190826 | A1 | 7/2009 | Tate et al. | |
| 2011/0288667 | A1* | 11/2011 | Noda | G05B 19/42 700/98 |
| 2012/0059517 | A1* | 3/2012 | Nomura | B25J 15/0004 901/31 |
| 2013/0006423 | A1* | 1/2013 | Ito | B25J 9/1612 901/46 |
| 2013/0345872 | A1* | 12/2013 | Brooks | B25J 9/1676 700/264 |
| 2015/0251314 | A1* | 9/2015 | Nammoto | B25J 9/1687 700/259 |
| 2016/0167228 | A1* | 6/2016 | Wellman | B25J 9/1602 901/3 |
| 2018/0297202 | A1 | 10/2018 | Nishitani | |

FOREIGN PATENT DOCUMENTS

| | | |
|---|---|---|
| JP | H10264065 A | 10/1998 |
| JP | H11239989 A | 9/1999 |
| JP | 2007064684 A | 3/2007 |
| JP | 2010142909 A | 7/2010 |
| JP | 5888591 B2 | 3/2016 |
| JP | 2018176367 A | 11/2018 |
| WO | 03051219 A1 | 6/2003 |

OTHER PUBLICATIONS

International Search Report issued in Intl. Appln. No. PCT/JP2019/010980 mailed May 28, 2019. English translation provided.

Written Opinion issued in Intl. Appln. No. PCT/JP2019/010980 mailed May 28, 2019. English translation provided.

Office Action issued in Chinese Appln. No. 201980054232.6, mailed Dec. 6, 2023. English machine translation provided.

* cited by examiner

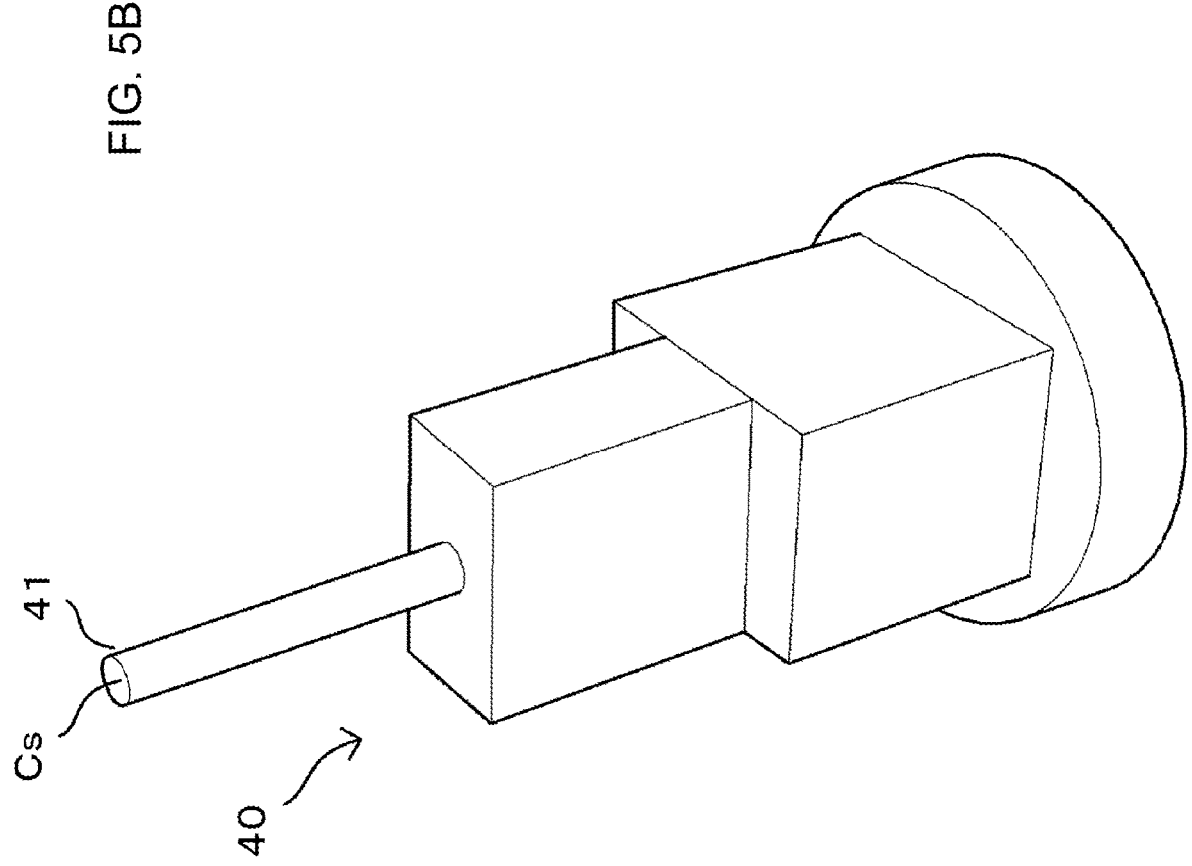
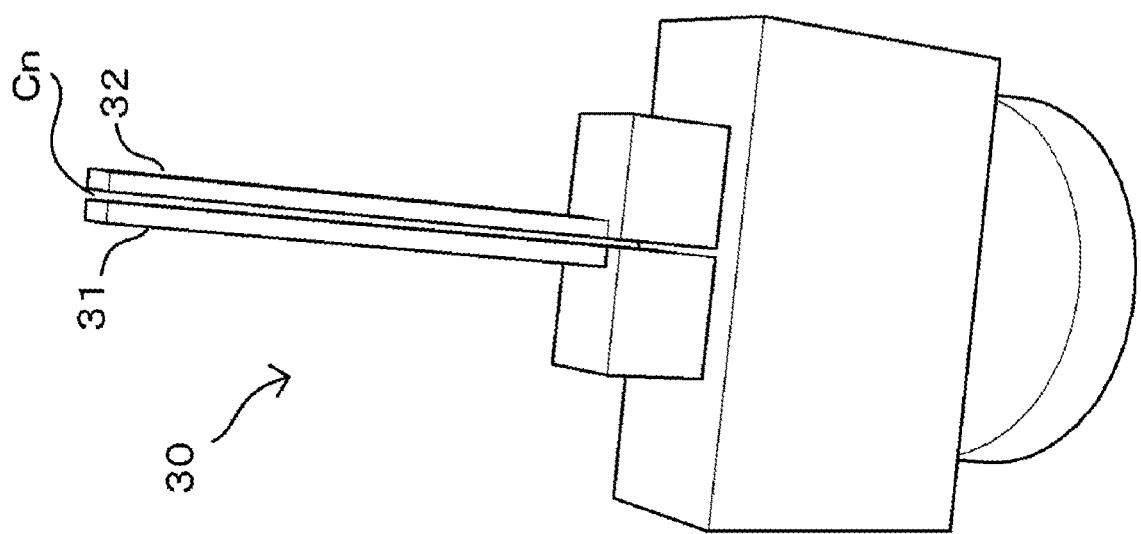

SETTINGS SUPPORT DEVICE, SETTINGS SUPPORT METHOD, AND PROGRAM

FIELD

The present invention relates to a setting assisting apparatus, a setting assisting method, and a setting assisting program.

BACKGROUND

Techniques have been developed to display a gripping target and a robot hand three-dimensionally using software and register a gripping position in response to a user designating a gripping pose (refer to, for example, Patent Literature 1).

With the above technique, the positional relationship between the gripping target and the robot hand cannot be determined accurately on a screen. Thus, the gripping position is difficult to adjust with an accuracy of, for example, 1 mm or less. Precisely determining the gripping position of the robot hand involves first registering the position and then actually gripping and repeatedly adjusting the position. This is time-consuming.

CITATION LIST

Patent Literature

Patent Literature 1: Japanese Patent No. 5888591

SUMMARY

Technical Problem

In response to the above issue, one or more aspects of the present invention are directed to a technique for efficiently setting an accurate gripping pose of a robot hand relative to a gripping target.

Solution to Problem

In response to the above issue, a setting assisting apparatus according to an aspect of the present invention is a setting assisting apparatus for assisting in setting a pose of a robot hand relative to a gripping target with the gripping target and the robot hand appearing on a screen. The setting assisting apparatus includes a pose calculator that calculates the pose of the robot hand relative to the gripping target, and an auxiliary view generator that generates rendering information for rendering, in accordance with the pose of the robot hand relative to the gripping target, an auxiliary view to aid in setting a pose of the robot hand relative to the gripping target appearing on the screen.

The above aspect of the present invention allows a user to calculate the pose of the robot hand relative to the gripping target by referring to an auxiliary view appearing on the screen, and thus can efficiently set an accurate gripping pose of the robot hand relative to the gripping target.

A robot hand herein refers to a tool that is computer-controllable to grip a gripping target. Examples include an end effector and a gripper. Gripping refers to holding a target. Examples include, but are not limited to, holding by grasping and holding by sucking. An auxiliary view may be in any shape but is to be represented two-dimensionally.

In the above aspect of the present invention, the auxiliary view generator may update the rendering information for rendering the auxiliary view in accordance with a change in the pose of the robot hand relative to the gripping target calculated by the pose calculator.

Although the user may change the pose of the robot hand relative to the gripping target, the auxiliary view is also updated to reflect the change, and the gripping pose of the robot hand relative to the gripping target can thus be set accurately based on the updated pose.

In the above aspect of the present invention, the auxiliary view may include an index indicating a distance or an angle between the gripping target and the robot hand.

This allows a user to check a distance or an angle between the gripping target and the robot hand by referring to an index included in the auxiliary view, and thus can more efficiently set an accurate gripping pose of the robot hand.

In the above aspect of the present invention, the auxiliary view generator may receive a change in a pose of the auxiliary view relative to the robot hand.

This structure allows an auxiliary view to appear in an intended pose relative to the robot hand and can set an accurate gripping pose of the robot hand more efficiently.

In the above aspect of the present invention, the auxiliary view may be rectangular prismatic.

In the above aspect of the present invention, the auxiliary view may be cylindrical.

In the above aspect of the present invention, the auxiliary view may be planar.

A setting assisting method according to another aspect of the present invention is a setting assisting method for assisting in setting a pose of a robot hand relative to a gripping target with the gripping target and the robot hand appearing on a screen. The setting assisting method includes calculating the pose of the robot hand relative to the gripping target, and generating rendering information for rendering, in accordance with the pose of the robot hand relative to the gripping target, an auxiliary view to aid in setting a pose of the robot hand relative to the gripping target appearing on the screen.

The above aspect of the present invention allows a user to calculate the pose of the robot hand relative to the gripping target by referring to an auxiliary view appearing on the screen, and thus can efficiently set an accurate gripping pose of the robot hand relative to the gripping target.

A robot hand herein refers to a tool that is computer-controllable to grip a gripping target. Examples include an end effector and a gripper. Gripping refers to holding a target. Examples include, but are not limited to, holding by grasping and holding by sucking. An auxiliary view may be in any shape but is to be represented two-dimensionally.

The setting assisting method according to the above aspect of the present invention may further include receiving a change in the pose of the robot hand relative to the gripping target. Calculating the pose may include calculating the pose of the robot hand relative to the gripping target based on the received change in the pose of the robot hand. Generating the rendering information may include updating the rendering information to reflect the pose calculated based on the received change in the pose of the robot hand.

Although the user may change the pose of the robot hand relative to the gripping target, the auxiliary view is also updated to reflect the change, and the gripping pose of the robot hand relative to the gripping target can thus be set accurately based on the resultant pose.

In the above aspect of the present invention, the auxiliary view may include an index indicating a distance or an angle between the gripping target and the robot hand.

This allows a user to check a distance or an angle between the gripping target and the robot hand by referring to an index included in the auxiliary view, and thus can more efficiently set an accurate gripping pose of the robot hand.

The setting assisting method according to the above aspect of the present invention may further include receiving a change in a pose of the auxiliary view relative to the robot hand. Generating the rendering information may include generating the rendering information based on the received change in the pose of the auxiliary view.

The structure allows an auxiliary view to appear in an intended pose relative to the robot hand and can set an accurate gripping pose of the robot hand more efficiently.

In the above aspect of the present invention, the auxiliary view may be rectangular prismatic.

In the above aspect of the present invention, the auxiliary view may be cylindrical.

In the above aspect of the present invention, the auxiliary view may be planar.

A program according to still another aspect of the present invention is a program for causing a computer to implement a setting assisting method for assisting in setting a pose of a robot hand relative to a gripping target with the gripping target and the robot hand appearing on a screen. The program causes the computer to perform operations including calculating the pose of the robot hand relative to the gripping target, and generating rendering information for rendering, in accordance with the pose of the robot hand relative to the gripping target, an auxiliary view to aid in setting a pose of the robot hand relative to the gripping target appearing on the screen.

The above aspect of the present invention allows a user to calculate the pose of the robot hand relative to the gripping target by referring to an auxiliary view appearing on the screen, and thus can efficiently set an accurate gripping pose of the robot hand relative to the gripping target.

A robot hand herein refers to a tool that is computer-controllable to grip a gripping target. Examples include an end effector and a gripper. Gripping refers to holding a target. Examples include, but are not limited to, holding by grasping and holding by sucking. An auxiliary view may be in any shape but is to be represented two-dimensionally.

The computer may not be a single computer but may be one of a plurality of computers that are connected together with a network.

Advantageous Effects

The technique according to the above aspects of the present invention can efficiently set an accurate gripping position of a robot hand relative to a gripping target.

BRIEF DESCRIPTION OF THE DRAWINGS

FIGS. 5A and 5B are overall schematic perspective views of a hand in the first embodiment of the present invention.

DETAILED DESCRIPTION

First Embodiment

A gripping position registration apparatus 10 including a gripping position setting assisting apparatus 1 according to an embodiment of the present invention will now be described in more detail with reference to the drawings.

Apparatus Structure

Figure 1:
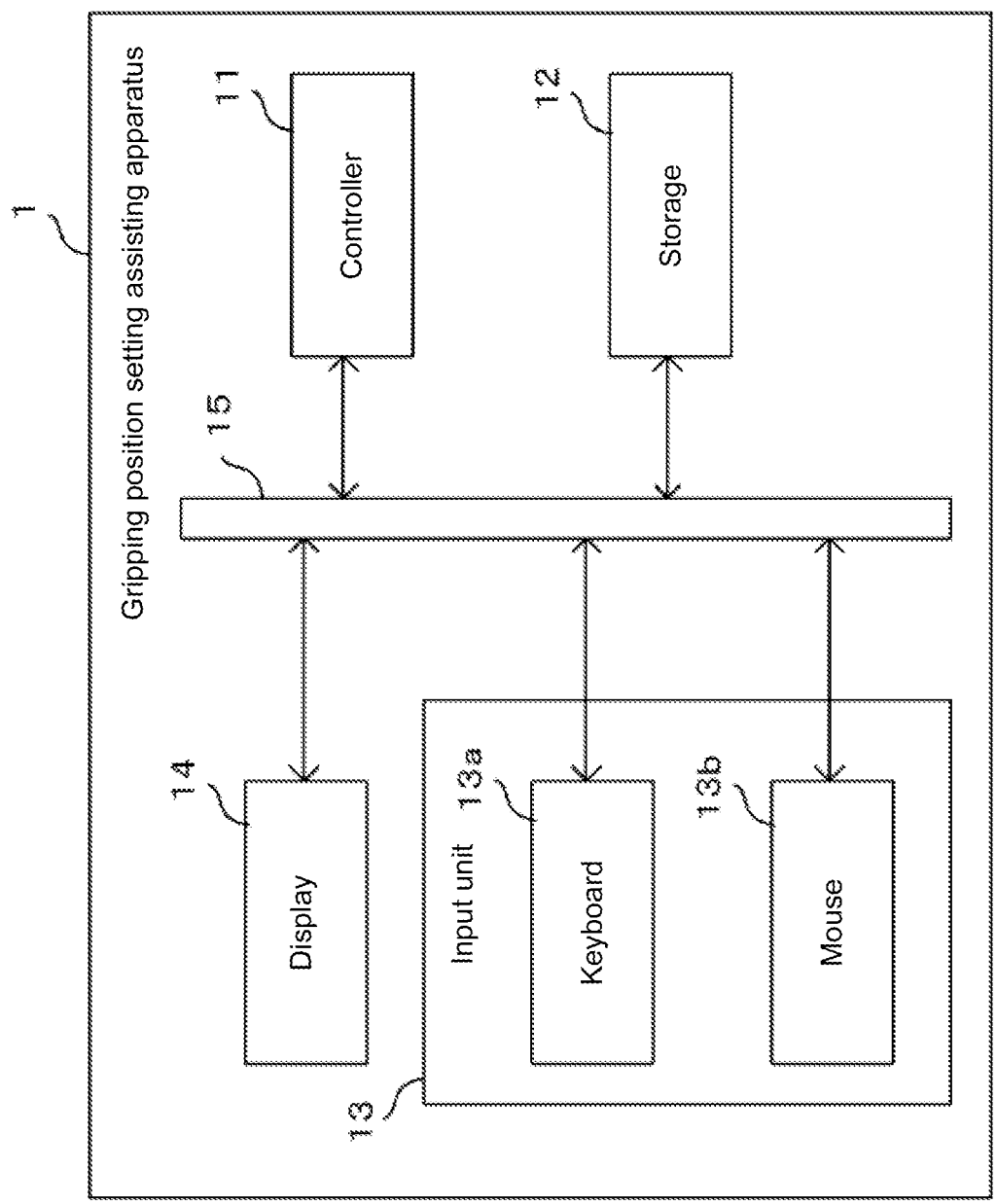
FIG. 1 is a block diagram of a gripping position setting assisting apparatus according to a first embodiment of the present invention showing its hardware configuration.
Figure 2:
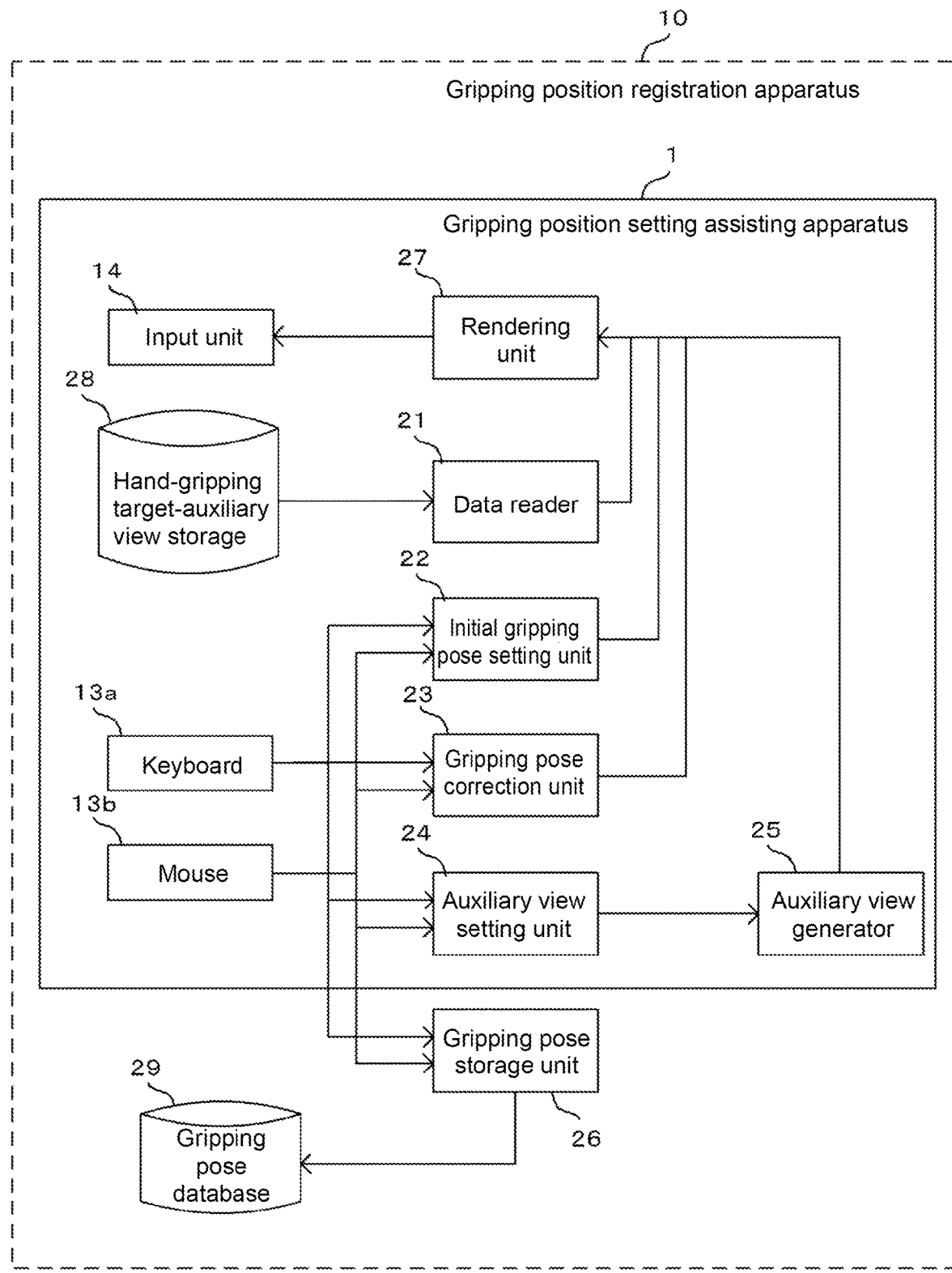
FIG. 2 is a functional block diagram of the gripping position setting assisting apparatus and a gripping position registration apparatus according to the first embodiment of the present invention.

FIG. 1 is a block diagram of the gripping position setting assisting apparatus 1 according to one embodiment showing its example hardware configuration. FIG. 2 is a functional block diagram of the gripping position registration apparatus 10 including the gripping position setting assisting apparatus 1.

As shown in FIG. 1, the gripping position setting assisting apparatus 1 mainly includes a controller 11, a storage 12, an input unit 13, a display 14, and a bus 15 connected to each component and serving as a signal transmission path. The gripping position setting assisting apparatus 1 may be implemented using a general-purpose computer.

The controller 11 is a processor such as a central processing unit (CPU) and a micro-processing unit (MPU).

The storage 12 includes a main storage device and an auxiliary storage device. The main storage device is a memory in which programs executable by the controller 11 and data used by the control programs are expanded. The auxiliary storage device stores, for example, an operating system (OS), various programs, and various tables, and loads the stored programs to a work area in the main storage device and executes the programs to control, for example, each component, and thus implement each function (described later) for a predetermined purpose. The functions may be partly or entirely implemented by a hardware circuit such as an application-specific integrated circuit (ASIC) and a field-programmable gate array (FPGA). The main storage device may include a random-access memory (RAM) or a read-only memory (ROM). The auxiliary storage device may include an erasable programmable ROM (EPROM) or a hard disk drive (HDD). The auxiliary storage device may additionally include a removable medium, or a portable recording medium. The removable medium may be, for example, a universal serial bus (USB) memory device or a disc storage medium such as a compact disc (CD) and a digital versatile disc (DVD).

The input unit 13 receives input operations from a user. In the present embodiment, the input unit 13 includes a keyboard 13a and a mouse 13b.

The display 14 displays information to provide information to a user. The display 14 includes, for example, a liquid crystal display and its controller. The display 14 may include a touchscreen panel and its controller to also serve as the input unit 13.

Referring to the functional block diagram of FIG. 2, the functions of the gripping position setting assisting apparatus 1 and the gripping position registration apparatus 10 according to the present embodiment will be described.

The gripping position registration apparatus 10 includes a data reader 21, an initial gripping pose setting unit 22, a gripping pose correction unit 23, an auxiliary view setting unit 24, an auxiliary view generator 25, a gripping pose storage unit 26, and a rendering unit 27. The gripping position setting assisting apparatus 1 includes at least the data reader 21, the initial gripping pose setting unit 22, the gripping pose correction unit 23, the auxiliary view setting unit 24, the auxiliary view generator 25, and the rendering unit 27. The gripping position registration apparatus 10 has the same hardware configuration as the gripping position setting assisting apparatus 1.

The data reader 21 reads, from a hand-gripping target-auxiliary view storage 28 storing data about a hand to be controlled, a gripping target to be gripped by the hand, and an auxiliary view, data about the hand, the gripping target, and the auxiliary view.

When a user places a pointer to any position on a gripping target appearing on the display 14 and clicks the mouse at the position, the initial gripping pose setting unit 22 registers the hand at the position.

In response to the user's input of a correction amount of a gripping pose of the hand relative to the gripping target, the gripping pose correction unit 23 reflects the amount in the gripping pose of the hand relative to the gripping target.

The auxiliary view setting unit 24 selects an auxiliary view to appear on the screen of the display 14 and reflects the selection result on the screen.

The auxiliary view generator 25 generates an auxiliary view based on the current pose of the hand.

The gripping pose storage unit 26 stores one or more registered gripping poses of the hand relative to the gripping target into a gripping pose database 29.

The rendering unit 27 renders three-dimensional shapes of the gripping target, the hand, and the auxiliary view on the display 14 based on information input from the data reader 21, the initial gripping pose setting unit 22, the gripping pose correction unit 23, and the auxiliary view generator 25.

In response to every user operation performed through the input unit in a graphical user interface (GUI) on the display 14, the rendering unit 27 recalculates the poses of the gripping target, the hand, and the auxiliary view at three-dimensional positions, and updates the display data on the display 14.

Figure 3:
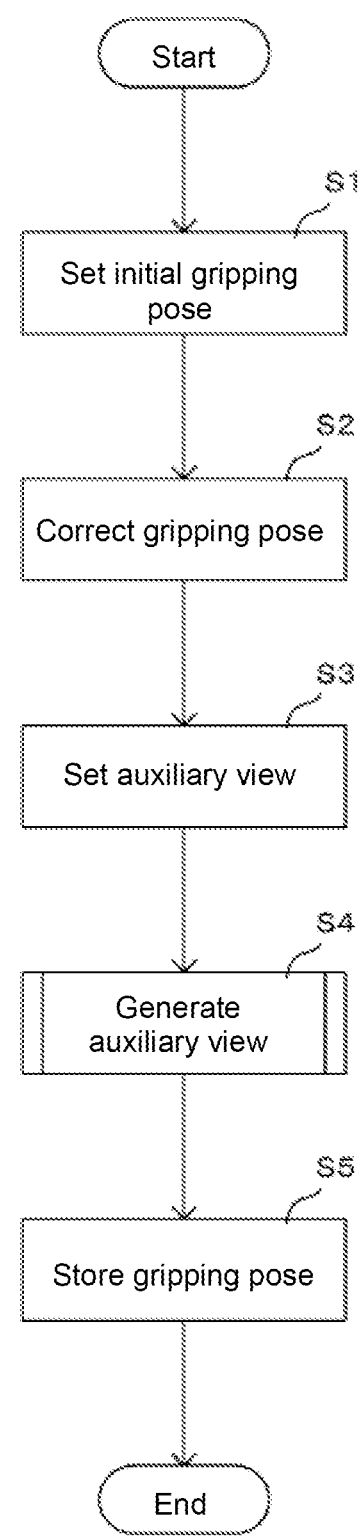
FIG. 3 is a flowchart showing an overall gripping position registration process in the first embodiment of the present invention.

The entire procedure for registering a gripping position including an auxiliary view generation process in the present embodiment will be described first with reference to FIG. 3.

The gripping position registration process mainly includes an initial gripping pose setting process (step S1), a gripping pose correcting process (step S2), an auxiliary view setting process (step S3), the auxiliary view generation process (step S4), and a gripping pose storing process (step S5).

In the initial gripping pose setting process (step S1), the initial pose of the hand relative to the gripping target is set based on the input from the user through the input unit 13. In the gripping pose correcting process (step S2), the pose relative to the gripping target is changed based on the initial position set in step S1 or the input of the correction amount from the user through the input unit 13 for the current pose of the hand relative to the gripping target. In the auxiliary view setting process (step S3), an input for setting an auxiliary view from the user through the input unit 13 is received to set the auxiliary view to be rendered. The setting of the auxiliary view includes selecting the auxiliary view to be rendered and changing the pose of the auxiliary view relative to the hand. The auxiliary view generation process (step S4) will be described later. In the gripping pose storing process, the registered gripping poses of the hand relative to the gripping target are stored into the gripping pose database 29 based on the input from the user through the input unit 13. In this embodiment, the initial gripping pose setting process (step S1) and the gripping pose correcting process (step S2) correspond to calculating the pose. The gripping pose correcting process (step S2) corresponds to receiving a change in the pose of the robot hand, and the auxiliary view setting process (step S3) corresponds to receiving a change in a pose of the auxiliary view. The auxiliary view generation process (described later) corresponds to generating rendering information.

Auxiliary View Generation Process

Figure 4:
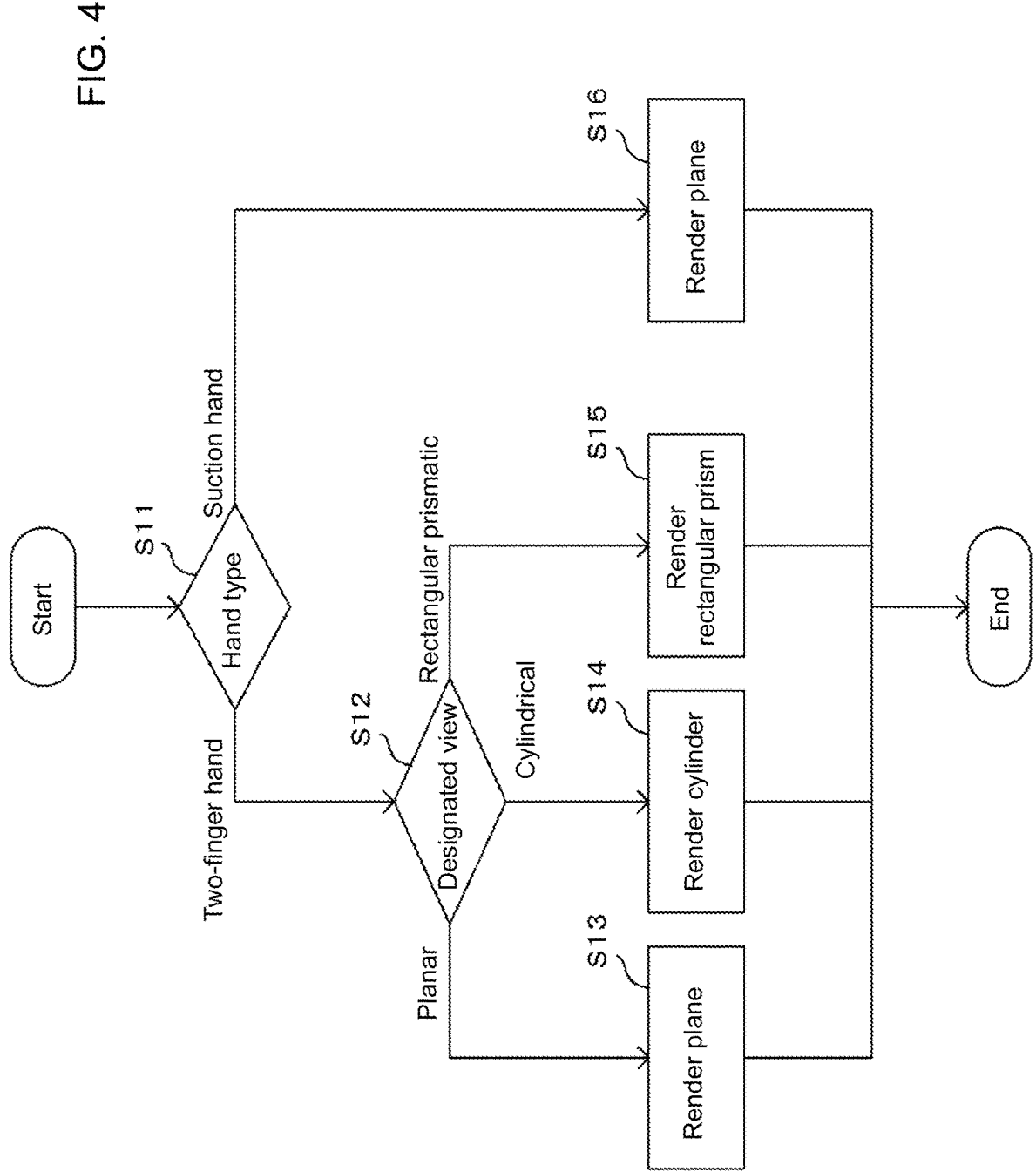
FIG. 4 is a flowchart showing an auxiliary view generation process in the first embodiment of the present invention.

FIG. 4 is a flowchart showing the auxiliary view generation process. The auxiliary view generation process will be described with reference to FIG. 4.

The initial gripping pose setting unit 22 first receives selection of a hand type from the user through the input unit 13, and determines the hand type based on the selection (step S11). In this embodiment, the hand type is selected from two types including a two-finger hand 30 having two jaws, or jaws 31 and 32, shown in FIG. 5A, and a suction hand 40 having a suction pad 41 at its distal end shown in FIG. 5B.

In response to determination of the hand type to be the two-finger hand in step S11, the type of a designated view is determined (step S12). The auxiliary view setting unit 24 receives the designation of the auxiliary view from the user, and determines the type of the designated view based on the designation.

In response to determination of the designated view to be planar in step S12, the auxiliary view generator 25 generates data for rendering a plane as the auxiliary view based on the current pose of the hand (step S13), and ends the auxiliary view generation process.

In response to determination of the designated view to be cylindrical in step S12, the auxiliary view generator 25 generates data for rendering a cylinder as the auxiliary view based on the current pose of the hand (step S14), and ends the auxiliary view generation process.

In response to determination of the designated view to be rectangular prismatic in step S12, the auxiliary view generator 25 generates data for rendering a rectangular prism as the auxiliary view based on the current pose of the hand (step S15), and ends the auxiliary view generation process.

In response to determination of the hand type to be the suction hand in step S11, the auxiliary view generator 25 generates data for rendering a plane as the auxiliary view based on the current pose of the hand (step S16), and ends the auxiliary view generation process.

In response to the gripping pose correction unit 23 updating the pose of the hand, the pose of the auxiliary view is also updated without changing the pose of the hand relative to the auxiliary view.

Figure 6A:
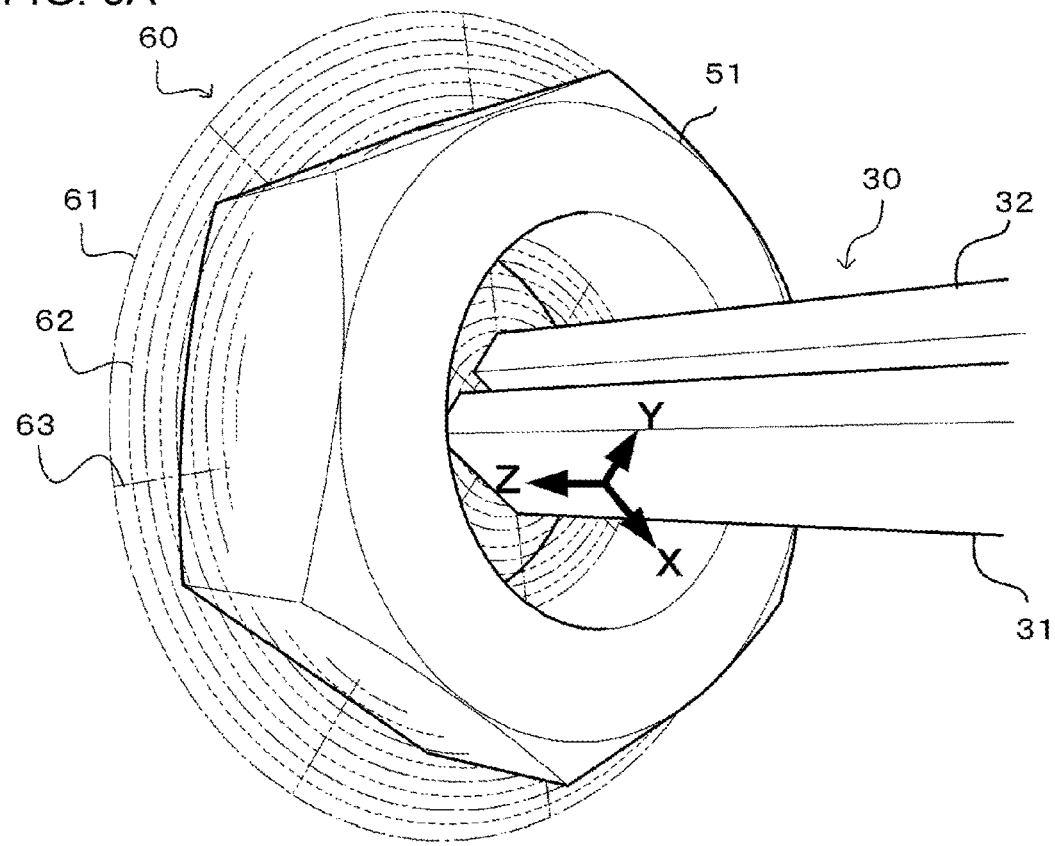
FIGS. 6A and 6B are views showing the relationship between a nut, the two-finger hand, and an auxiliary view in the first embodiment of the present invention.
Figure 6B:
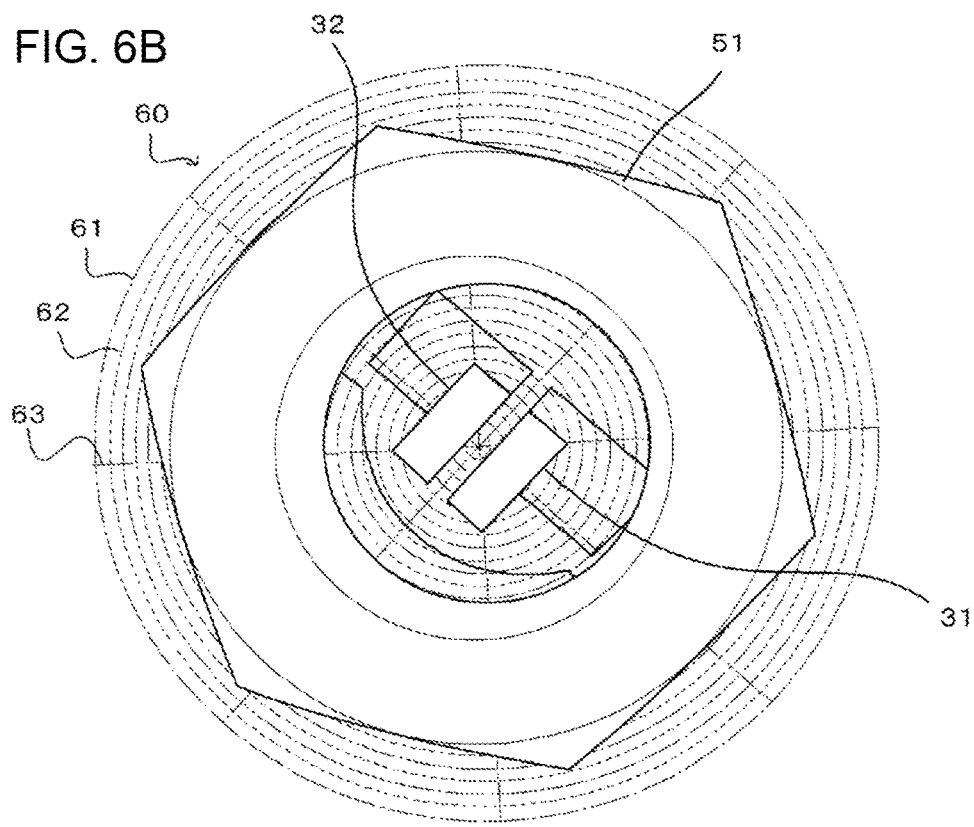

FIG. 6A is a perspective view showing a circle 60 including concentric circles about the center between the jaws 31 and 32 on the two-finger hand 30 received in a hole of a nut 51 to be a gripping target. The concentric circles are orthogonal to a direction toward the distal ends of the jaws 31 and 32. The circle 60 is rendered as a plane. FIG. 6B is a view of the nut 51 viewed on its end face opposite to the end face shown in FIG. 6A. The center between the jaws 31 and 32, indicated by Cn in FIG. 5A, is the middle of a straight line connecting the midpoints of the distal ends of the jaws. The circle 60 is rendered to be in contact with jaws 41 and 42 on the plane and has different poses in response to pose changes of the jaws 31 and 32 relative to the nut 51. As shown in FIG. 6A, the jaws 31 and 32 each have the distal end placed further from the end face of the nut 51 in the thickness direction in the hole of the nut 51. The circle 60 is rendered to overlap the nut 51, with the outer circumference of some concentric circles extending through the outer side surface of the nut 51.

The diameter of the circle 60 rendered is a constant multiple of the longest side of a rectangle circumscribing the shape of the gripping target. The diameter of the circle 60 may be about 1.5 times or greater of the longest side of a rectangle circumscribing the shape of the gripping target. The circle 60 with a too small diameter is hidden by the gripping target. In this case, the inclination of the hand 30 relative to the gripping target is difficult to view. For a gripping target with a hollow space such as a hole that may be difficult to view directly depending on the pose of the hand 30 relative to the gripping target, the circle 60 with an appropriate diameter can be used as a reference for indirectly viewing the relative positional relationship between the gripping target and the hand 30.

For a hollow gripping target to be gripped at its inner diameter, such as the nut 5, the plane 60 including the concentric circles is rendered in accordance with the current pose of the two-finger hand 30 to allow easy alignment of the center between the jaws 31 and 32 with the center of the hole. Having the center aligned with the center of the hole, the jaws open to grip a gripping target at its inner diameter can both come in contact with the gripping target at the same time and can grip the gripping target without slipping. Also, the relationship between the rendered circle 60 and the hole is viewable to facilitate fine adjustment of the relative positional relationship between the gripping target and the hand. The circle 60 includes concentric circles 61 and 62 appearing alternately in different colors in the radial direction (the concentric circle 61 is indicated by a dot-and-dash line and the concentric circle 62 by a broken line to represent their color differences in the figure) to allow multiple circles to be easily distinguishable from each other. 60 has radiuses 63 rendered at equal intervals to extend radially from the center. This allows the center of the circle 60 to be detected easily. In this embodiment, the concentric circles with different radiuses each correspond to an index indicating the distance between the gripping target and the hand, and the radiuses each correspond to the angle between the gripping target and the hand.

In this manner, the plane 60 is rendered as the auxiliary view in contact with the two-finger hand 30 to allow visual determination as to whether the hole of the gripping target and the direction toward the distal ends of the jaws 31 and 32 on the hand 30 are orthogonal to each other.

Second Embodiment

A second embodiment will now be described. The components that are the same as in the first embodiment are given the same numerals as those components and will not be described in detail. The second embodiment is the same as the first embodiment in the structure of the gripping position registration apparatus and the auxiliary view generation process, but differs from the first embodiment in the gripping target and the auxiliary view.

Figure 7A:
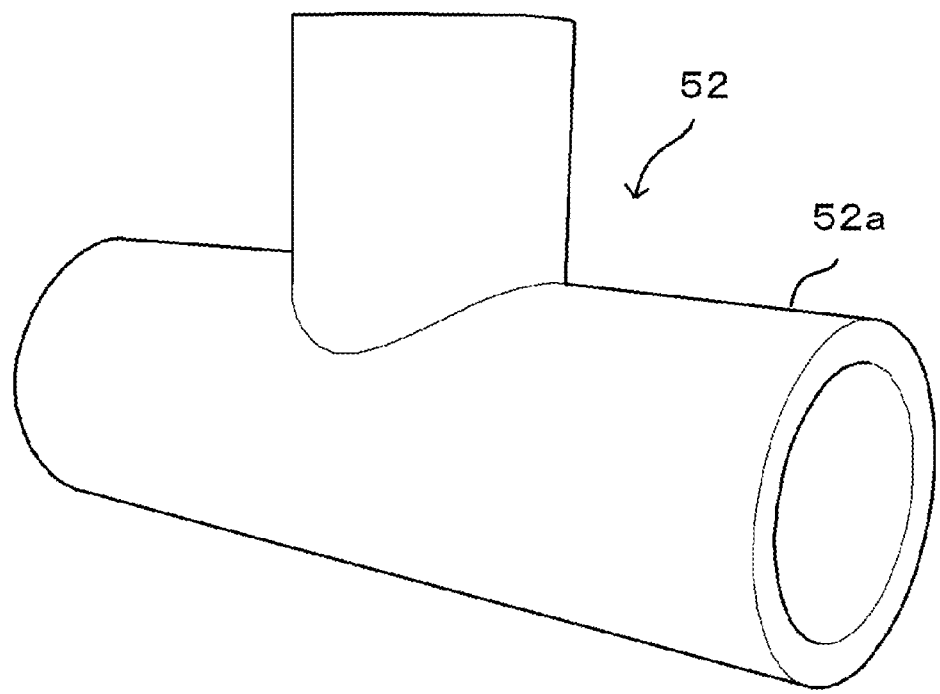
FIGS. 7A and 7B are views of the entire shape of a T-tube and the relationship between the T-tube, a two-finger hand, and an auxiliary view in a second embodiment of the present invention.
Figure 7B:
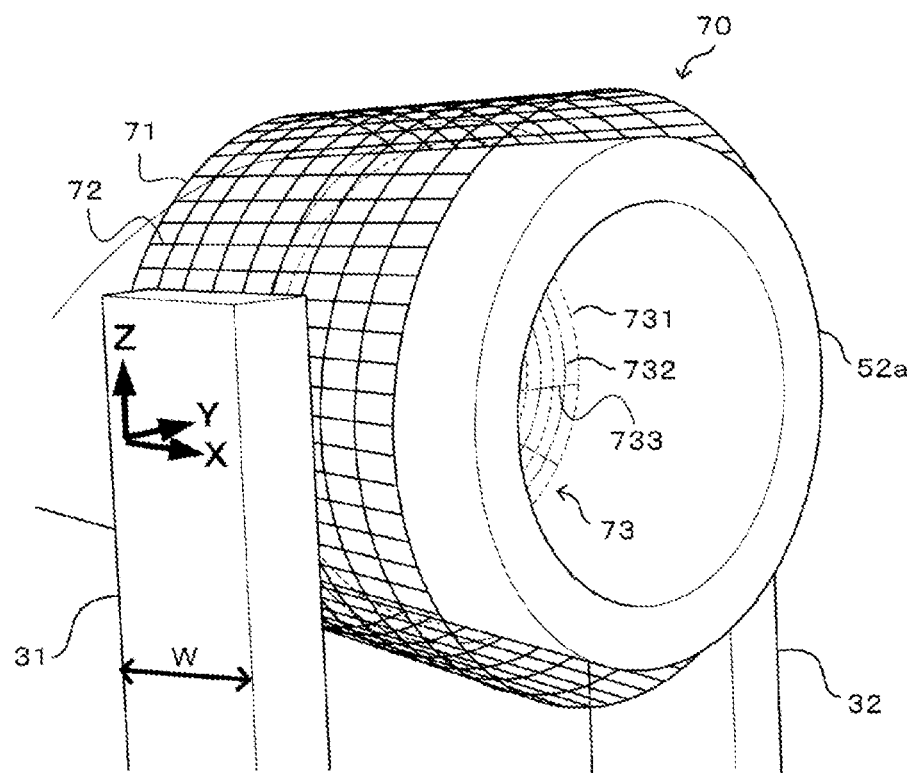

FIG. 7A is a view of the entire shape of a T-tube 52 to be a gripping target. FIG. 7B shows a cylinder 70 rendered as an auxiliary view having the central axis orthogonal to the opening and closing directions and the longitudinal direction of the jaws 31 and 32 at the center between the jaws 31 and 32 on the two-finger hand 30 and being in contact with the inner side surfaces of the jaws 31 and 32 griping a tubular portion 52a of the T-tube 52 from radially outside. The cylinder 70 includes, at equal intervals in the axial direction, circumferential lines 71 orthogonal to the central axis of the cylinder 70, and includes, at equal intervals in the circumferential direction, axial lines 72 parallel to the axial direction of the cylinder 70. The cylinder 70 also includes a circle 73 about the center between the jaws 31 and 32 and parallel to the opening and closing directions and the longitudinal direction of the jaws 31 and 32. The circle 73 includes concentric circles 731 and 732 appearing in different colors in the radial direction (the concentric circle 731 is indicated by a broken line and the concentric circle 732 by a dot-and-dash line in the figure). The circle 73 includes, at equal intervals in the circumferential direction, radiuses 733 extending radially from the center between the jaws 31 and 32. The circle 73 appears in the range from the center between the jaws 31 and 32 to the circumferential lines 71.

In this embodiment, the circumferential lines 71, the axial lines 72, and the concentric circles 731 and 732 each correspond to an index indicating the distance between the gripping target and the hand. The radiuses 733 each correspond to the angle between the gripping target and the hand. The axial lines 72 may also be used as an index indicating the angle between the gripping target and the hand.

Figure 8A:
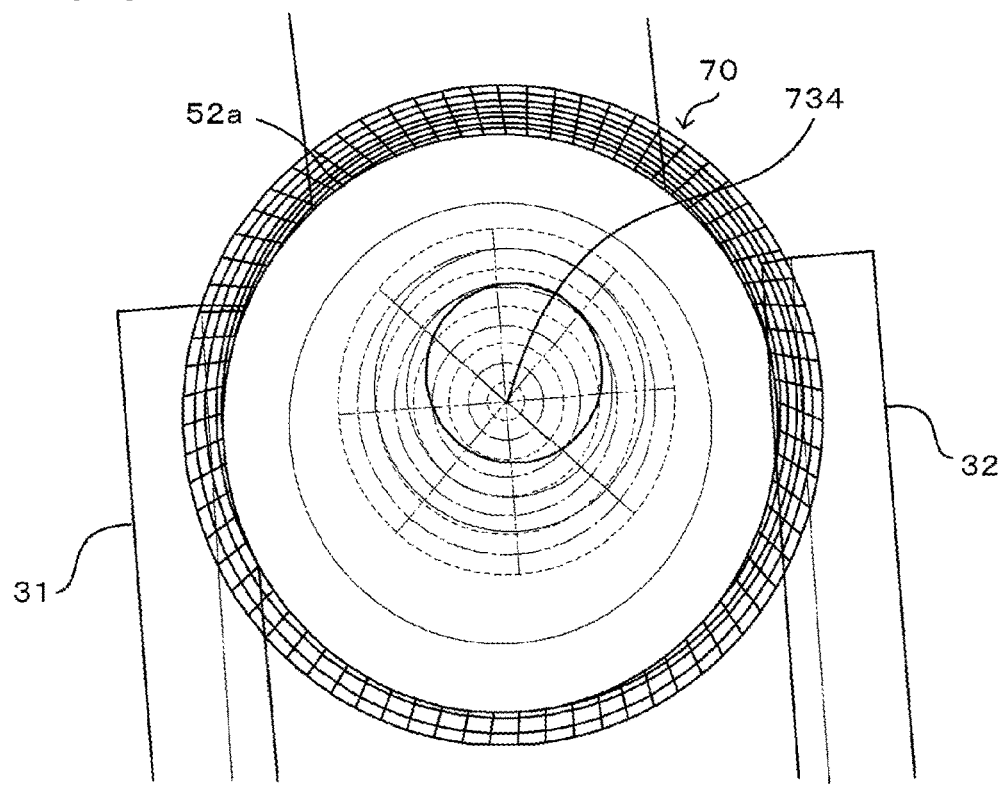
FIGS. 8A and 8B are views showing the relationship between the T-tube, the two-finger hand, and the auxiliary view in the second embodiment of the present invention.
Figure 8B:
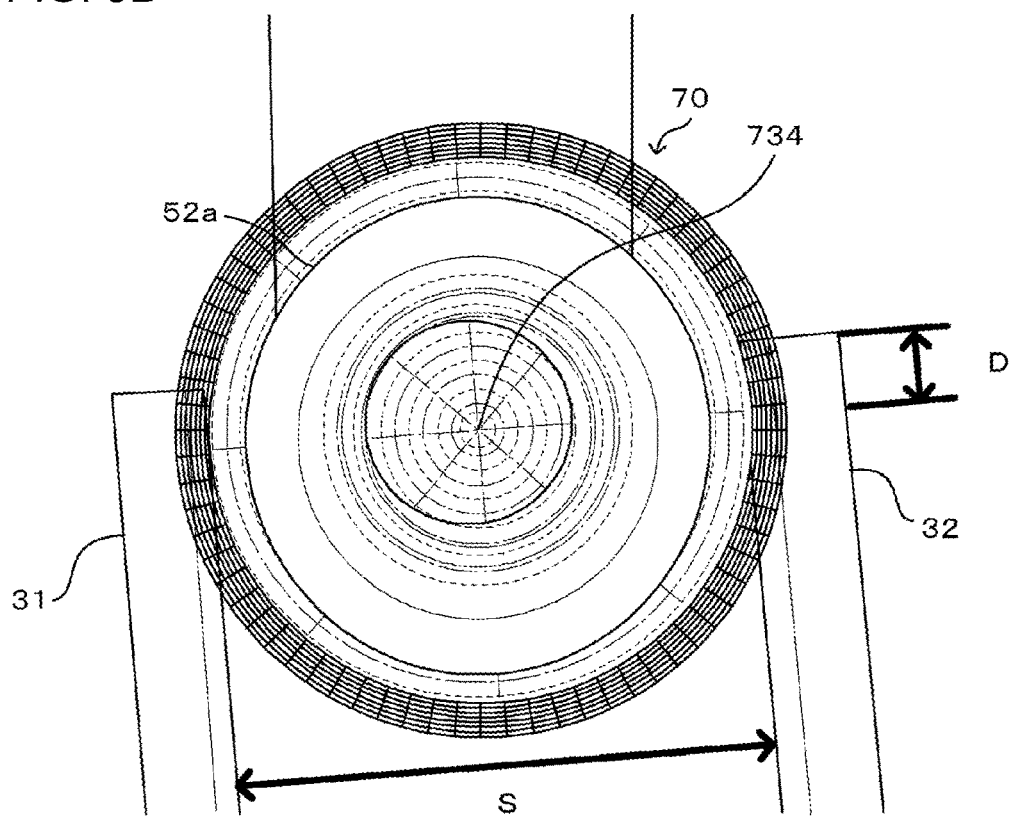

FIGS. 8A and 8B are views of the tubular portion 52a of the T-tube 52 viewed in the longitudinal direction of the tubular portion 52a. FIG. 8A shows the tubular portion 52a of the T-tube 52 having the central axis displaced from a center 734 of the circle 73. FIG. 8B shows the T-tube 52 having the central axis 52a aligned with the center 734 of the circle. In this embodiment, the center between the jaws 31 and 32 on the two-finger hand 30 is the middle of a straight line connecting the midpoints of the jaws 31 and 32 in the width direction. Although the center between the jaws 31 and 32 is defined at their basal ends rather than their distal ends in this embodiment, the positional relationship between the jaws 31 and 32 and the cylinder 70 may be adjustable as described later.

The height of the rendered cylinder 70 is a constant multiple of a width W (refer to FIG. 7B) of each of the jaws 31 and 32 on the two-finger hand 30.

The gripping depth (refer to FIG. 8B) of the hand 30 is adjustable. The gripping depth D of the hand 30 indicates the distance between Z-axis (the longitudinal direction of each jaw, refer to FIG. 8B) in a tool coordinate system defined for the hand 30 and the central axis of the cylinder 70. As shown in FIG. 8B, the gripping depth D is herein defined from the end faces of the jaws 31 and 32.

The diameter of the cylinder 70 can change in accordance with a stroke width S of the hand 30 (the opening width between the jaws, refer to FIG. 8B).

The cylinder 70 is rendered in accordance with the current pose of the two-finger hand 30 to allow easy alignment of the center between the jaws 31 and 32 with the central axis of a cylindrical gripping target to be gripped. The concentric circles 731 and 732 appear alternately in different colors in the radial direction to be easily distinguished from each other. The radiuses 733 allow the center 734 of the circle 73 to be easily viewable on the screen.

This allows the inclination of the jaws 31 and 32 on the two-finger hand 30 relative to the gripping target to be viewable.

Third Embodiment

A third embodiment will now be described. The components that are the same as in the first embodiment are given the same numerals as those components and will not be described in detail. The third embodiment is the same as the first embodiment in the structure of the gripping position registration apparatus and the auxiliary view generation process, but differs from the first embodiment in the gripping target and the auxiliary view.

Figure 9A:
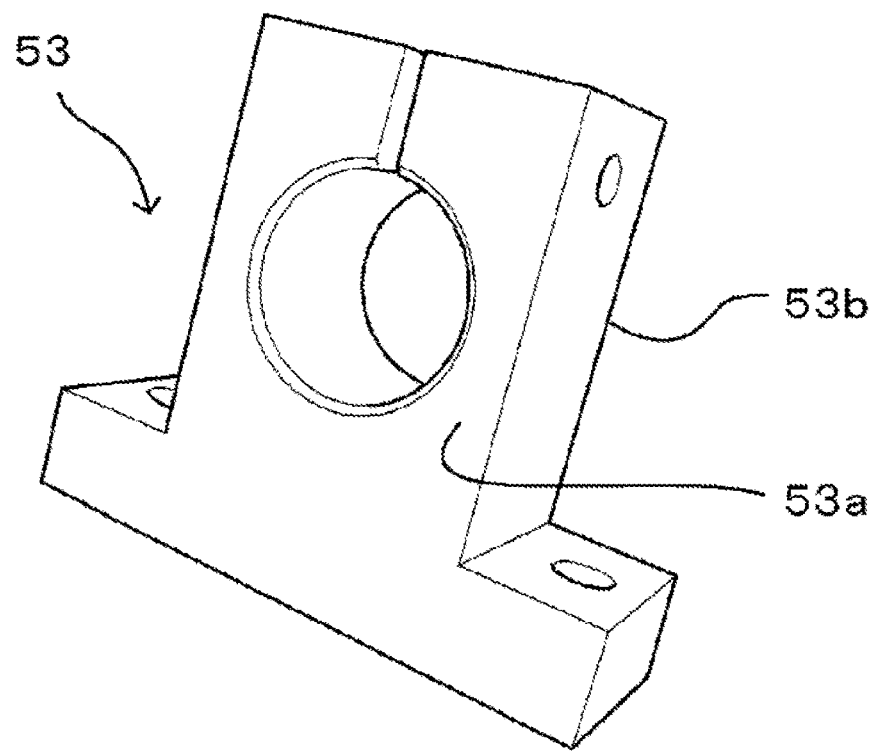
FIGS. 9A and 9B are views of the entire shape of a holder and the relationship between the holder, a two-finger hand, and an auxiliary view in a third embodiment of the present invention.
Figure 9B:
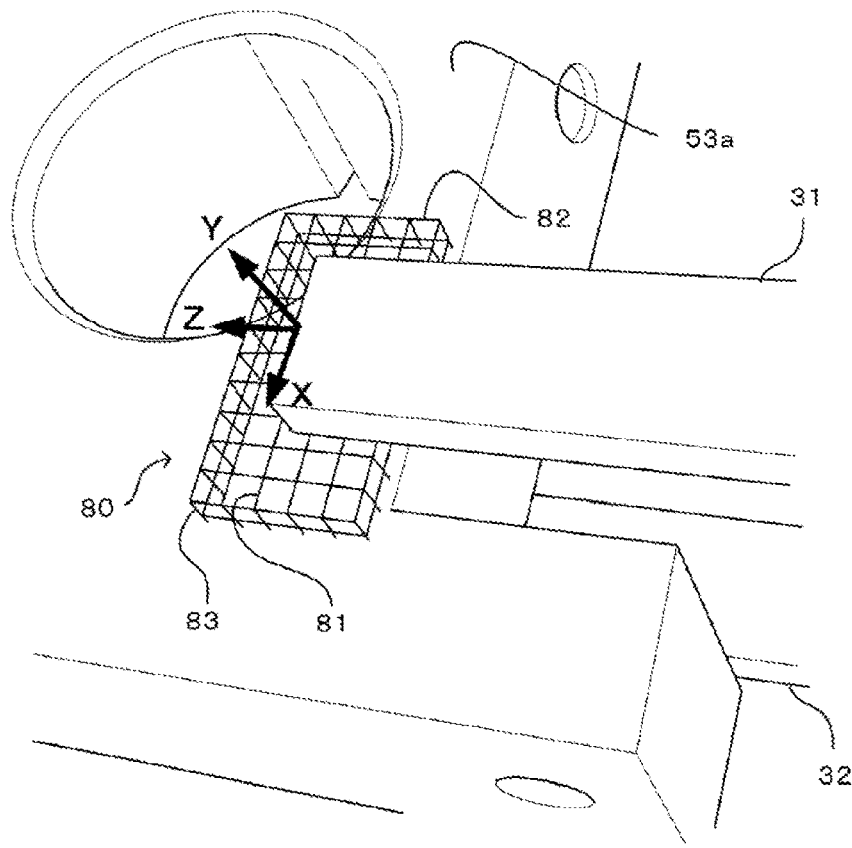
Figure 10:
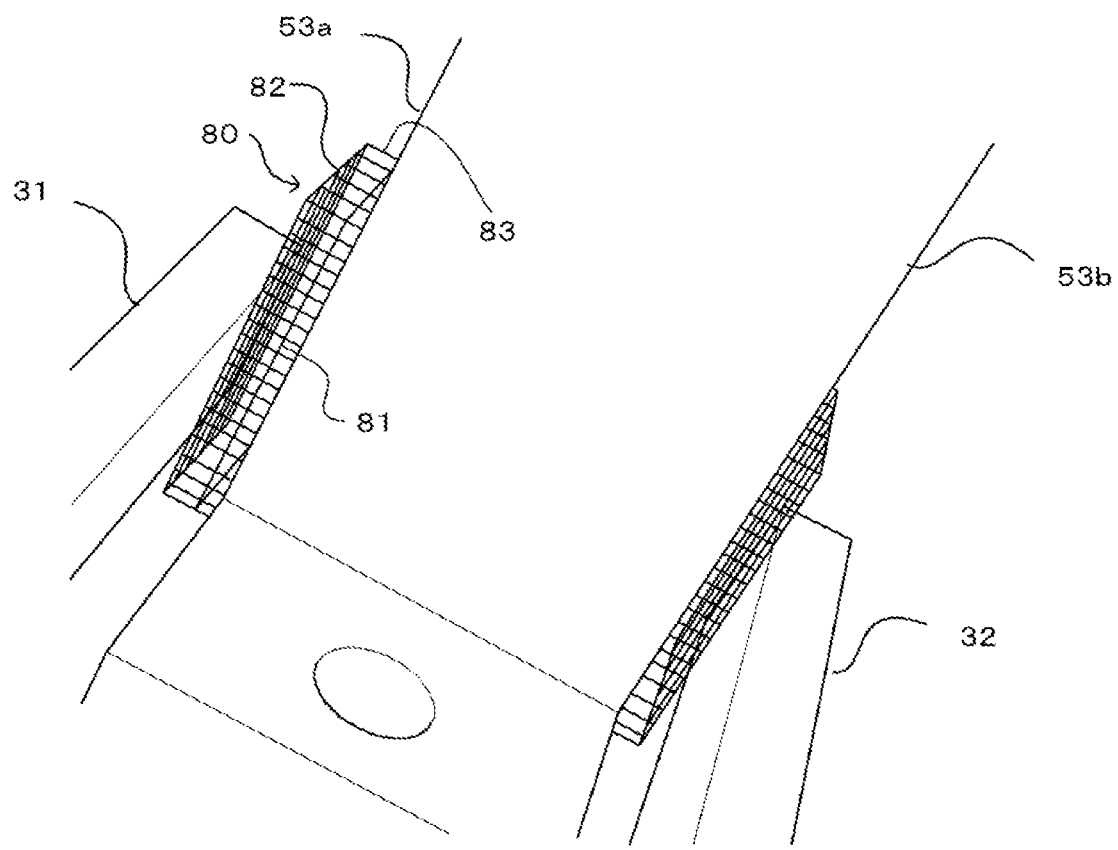
FIG. 10 is a view showing the relationship between the holder, the two-finger hand, and the auxiliary view in the third embodiment of the present invention.

FIG. 9A is an overall perspective view of a holder 53 to be a gripping target. FIGS. 9B and 10 show a rectangular prism 80 rendered as an auxiliary view orthogonal to the opening and closing directions of the jaws 31 and 32 on the two-finger hand 30 and being in contact with the inner side surfaces of the jaws 31 and 32 gripping end faces 53a and 53b of the holder 53. FIG. 10 is a view of the rectangular prism 80 shown in FIG. 9B as viewed from the basal ends of the jaws 31 and 32. The rectangular prism 80 includes multiple lines orthogonal to one another, including width lines 81 extending in the width directions of the jaws 31 and 32, height lines 82 extending in the longitudinal direction of the jaws 31 and 32, and thickness lines 83 extending in the opening width directions of the jaws 31 and 32. These sets of the width lines 81, the height lines 82, and the thickness lines 83 appear at equal intervals. In the present embodiment, the width lines 81, the height lines 82, and the thickness lines each correspond to an index indicating the distance between the gripping target and the hand.

The length of a side of the rectangular prism 80 rendered in this case is a constant multiple of the width W (refer to FIG. 7B) of each of the jaws 31 and 32.

The size of the rectangular prism 80 is changed in accordance with the stroke width S of the hand (opening width between the jaws, refer to FIG. 8B).

The rectangular prism 80 is rendered in accordance with the current pose of the two-finger hand 30 to allow easy positioning at the distance from the jaws 31 and 32 to a flat gripping target to be gripped.

In this manner, the rectangular prism 80 is rendered as the auxiliary view in contact with the two-finger hand 30 to allow the inclination of the jaws 31 and 32 on the two-finger hand 30 relative to the gripping target to be viewable.

Fourth Embodiment

A fourth embodiment will now be described. The components that are the same as in the first embodiment are given the same numerals as those components and will not be described in detail. The fourth embodiment is the same as the first embodiment in the structure of the gripping position registration apparatus and the auxiliary view generation process, but differs from the first embodiment in the gripping target, the hand, and the auxiliary view.

Figure 11A:
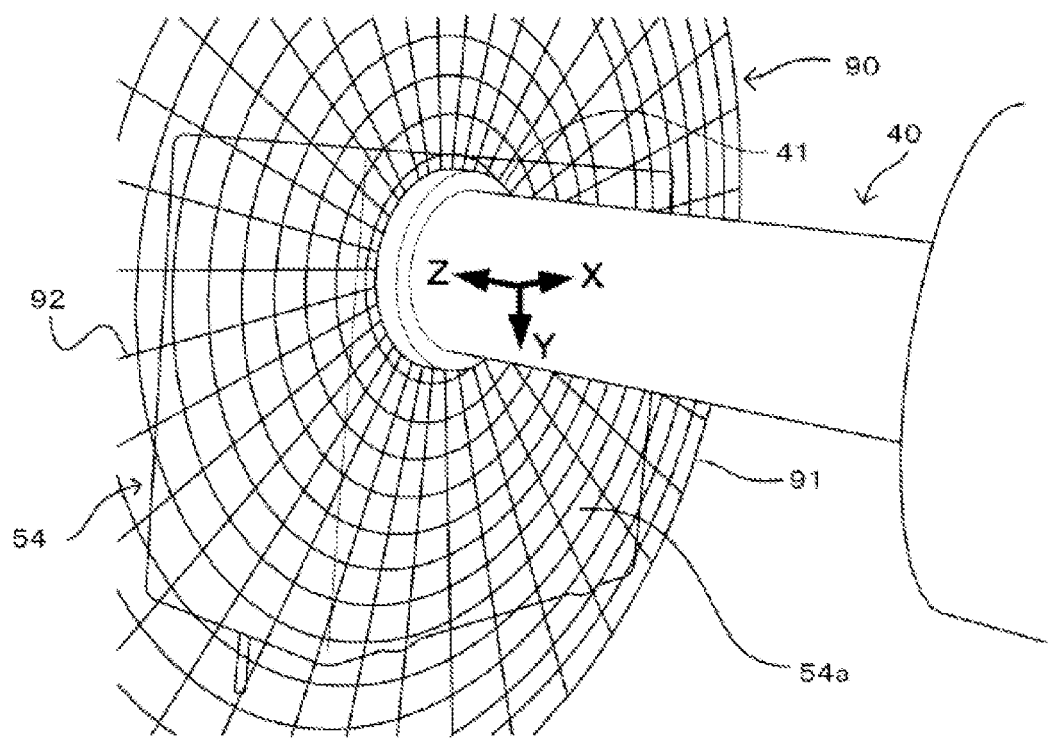
FIGS. 11A and 11B are views showing the relationship between a capacitor, a suction hand, and an auxiliary view in a fourth embodiment of the present invention.
Figure 11B:
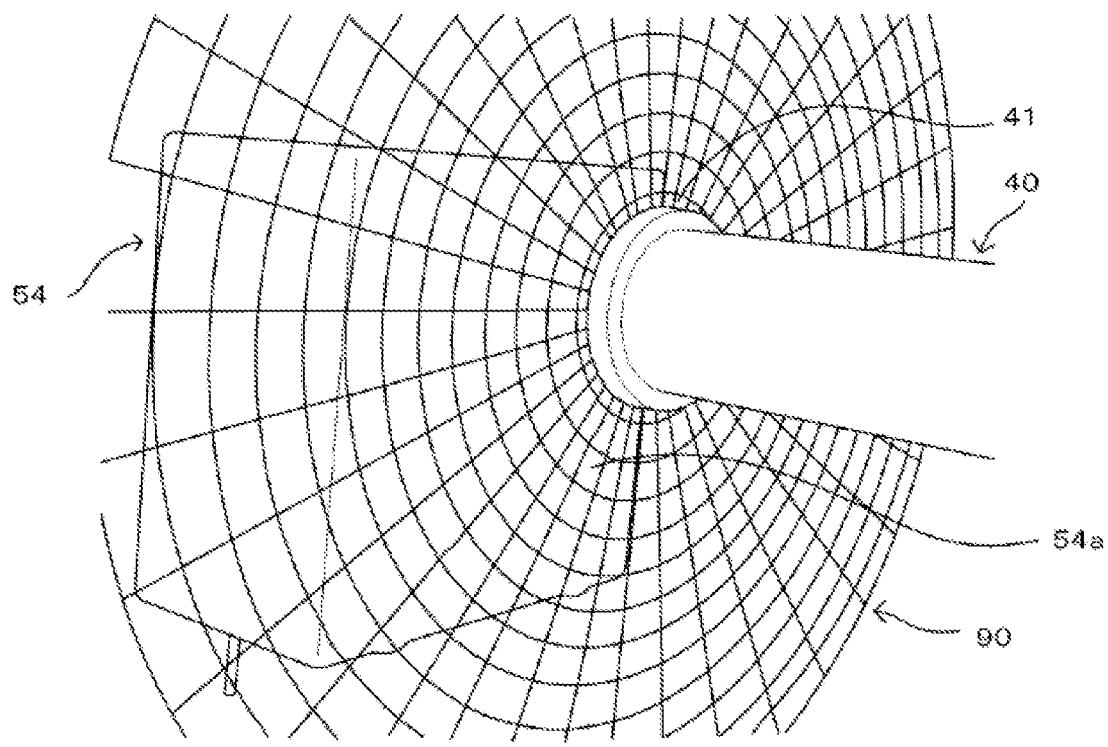
Figure 12:
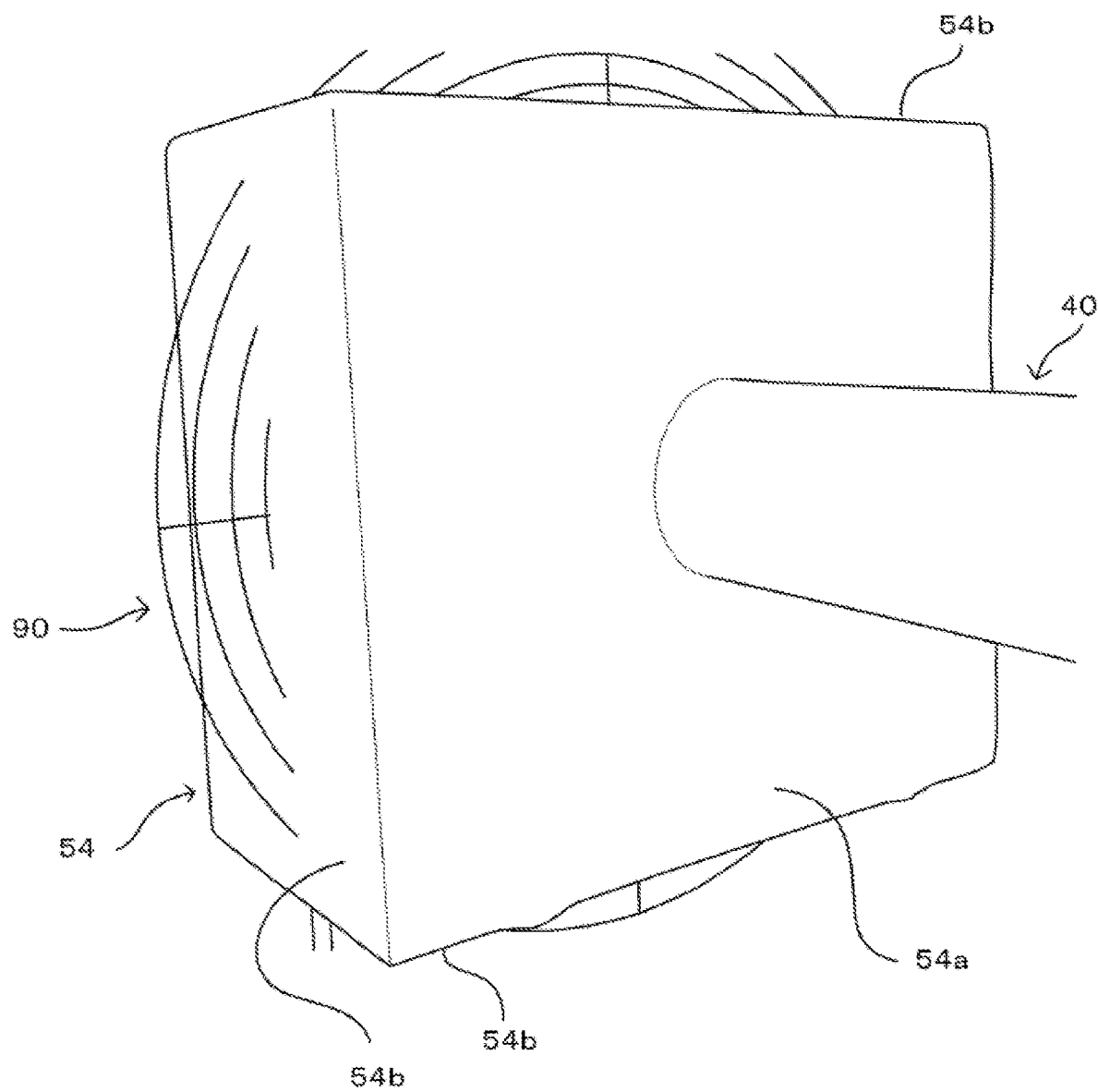
FIG. 12 is a view showing the relationship between the capacitor, the suction hand, and the auxiliary view in the fourth embodiment of the present invention.

FIGS. 11A, 11B, and 12 show a plane 90 that is rendered as an auxiliary view with respect to a side surface 54a of a capacitor 54 to be a gripping target in accordance with the current pose of the suction hand 40 having the suction pad 41. The plane 90 extends in a direction orthogonal to the distal end of the suction pad 41 about the suction pad 41 at the distal end of the suction hand 40. FIG. 11A shows the extendable suction hand 40 in an extended state. FIG. 11B shows the suction hand 40 in a retracted state. FIG. 12 shows the suction pad 41 at the distal end of the suction hand 40 pressed in the side surface 54a of the capacitor 54 as the gripping target. In FIG. 12, the circle 90 overlaps the capacitor 54 and has an outer circumference extending through side surfaces 54b of the capacitor 54.

In FIGS. 11A, 11B, and 12, the circle 90 is rendered as a plane extending in the direction orthogonal to the distal end of the suction pad 41. The circle 90 includes concentric circles 91 about a center Cs (refer to FIG. 5B) of the suction pad 41 and radiuses 92 that extend radially. The diameter of the circle 90 rendered is a constant multiple of the longest side of a rectangle circumscribing the shape of the gripping target. The diameter of the circle 90 may be about 1.5 times or greater of the longest side of a rectangle circumscribing the shape of the gripping target. The circle 90 with a too small diameter is hidden by the gripping target. In this case, the positional relationship between the suction hand 40 and the gripping target is difficult to view.

In this embodiment, the concentric circles 91 each correspond to an index indicating the distance between the gripping target and the hand, and the radiuses each correspond to the angle between the gripping target and the hand.

The plane 90 is rendered in accordance with the current pose of the suction hand 40 to allow determination of the degree by which the extended suction hand is inserted. The suction hand 40 includes typical structures of extendable bellows or spring to allow reproduction of the degree. The suction hand 40 may have the suction pad 41 inserted in the gripping target in an extended state and have the suction pad 41 being out of contact with the gripping target in a retracted state. The plane 90 appears in correspondence with the distal end of the suction pad 41 to allow determination of the degree by which the suction pad 41 is inserted into the gripping target.

The plane 90 appears in correspondence with the distal end of the suction pad 41 to allow determination whether the suction pad 41 is inclined relative to the gripping target. The surfaces of the suction pad 41 and the gripping target may be parallel to each other to allow the suction pad 41 to appropriately suck the gripping target. The suction pad 41 inclined relative to the surface of the gripping target may cause failures in gripping.

Modifications

Although the first embodiment describes the two-finger hand 30 and the suction hand 40, the present invention is also applicable to other types of hands including, but not limited to, a three-finger hand or a magnetic hand. An effective auxiliary view may differ for each hand type.

Figure 13A:
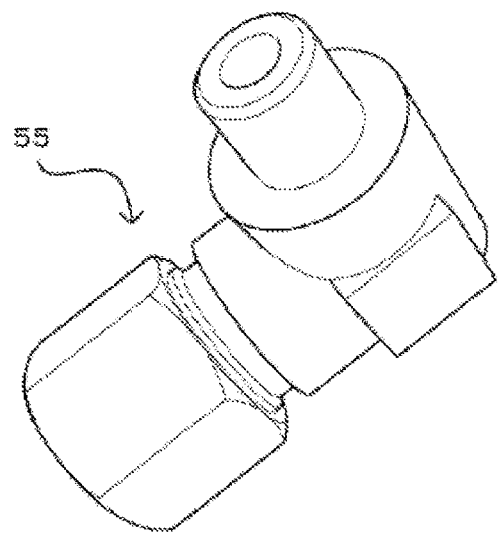
FIGS. 13A to 13C are overall perspective views of gripping targets in a modification of the present embodiment.
Figure 13B:
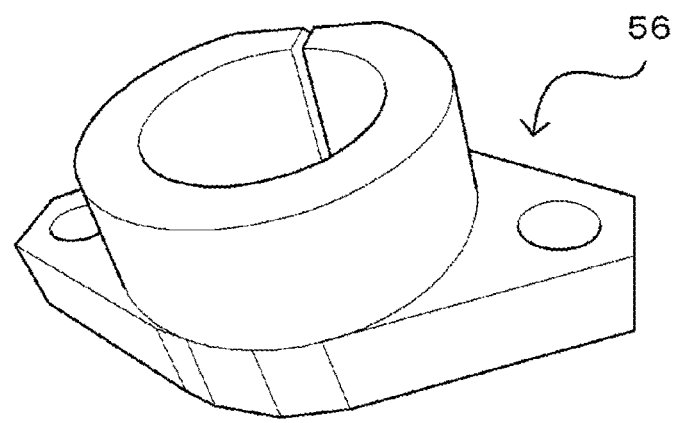
Figure 13C:
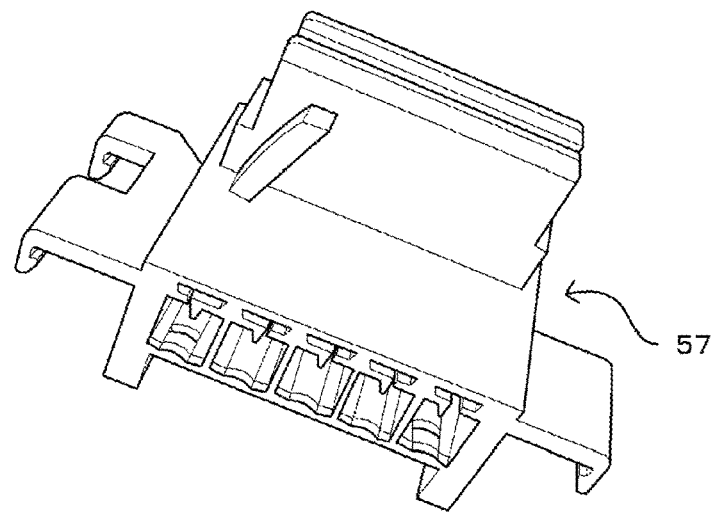

Examples of the auxiliary views described above include the circles 60 and 90, the cylinder 70, and the rectangular prism 80. However, the auxiliary views are not limited to these views. The gripping targets to be rendered as auxiliary views include a connector 55 shown in FIG. 13A, a holder 56 shown in FIG. 13B, and a connector 57 shown in FIG. 13C. However, other gripping targets may be rendered as auxiliary views.

In the first embodiment described above, the user designates the auxiliary view through the input unit 13. In some embodiments, an optimal auxiliary view may be automatically calculated based on information about the shape of the gripping target and the pose of the hand.

The elements in the aspects of the present invention below are identified with reference numerals used in the drawings to show the correspondence between these elements and the components in the embodiments.

Aspect 1

A setting assisting apparatus (10) for assisting in setting a pose of a robot hand (30, 40) relative to a gripping target (51 to 57) with the gripping target (51 to 57) and the robot hand (30, 40) appearing on a screen, the apparatus (10) comprising:
 a pose calculator (22, 23) configured to calculate the pose of the robot hand (30, 40) relative to the gripping target (51 to 57); and
 an auxiliary view generator (25) configured to generate rendering information for rendering, in accordance with the pose of the robot hand (30, 40) relative to the gripping target (51 to 57), an auxiliary view (60, 70, 80, 90) to aid in setting a pose of the robot hand (30, 40) relative to the gripping target (51 to 57) appearing on the screen.

Aspect 2

A setting assisting method for assisting in setting a pose of a robot hand (30, 40) relative to a gripping target (51 to 57) with the gripping target (51 to 57) and the robot hand (30, 40) appearing on a screen, the method comprising:
 calculating the pose of the robot hand (30, 40) relative to the gripping target (51 to 57) (steps S1 and S2); and
 generating rendering information for rendering, in accordance with the pose of the robot hand (30, 40) relative to the gripping target (51 to 57), an auxiliary view (60, 70, 80, 90) to aid in setting a pose of the robot hand (30, 40) relative to the gripping target (51 to 57) appearing on the screen (step S4).

Aspect 3

A program for causing a computer to implement a setting assisting method for assisting in setting a pose of a robot hand (30, 40) relative to a gripping target (51 to 57) with the gripping target (51 to 57) and the robot hand (30, 40) appearing on a screen, the program causing the computer to perform operations comprising:
 calculating the pose of the robot hand (30, 40) relative to the gripping target (51 to 57) (steps S1 and S2); and
 generating rendering information for rendering, in accordance with the pose of the robot hand (30, 40) relative to the gripping target (51 to 57), an auxiliary view (60, 70, 80, 90) to aid in setting a pose of the robot hand (30, 40) relative to the gripping target (51 to 57) appearing on the screen (step S4).

REFERENCE SIGNS LIST

1 gripping position setting assisting apparatus
21 data reader
22 initial gripping pose setting unit
23 gripping pose correction unit
24 auxiliary view setting unit
25 auxiliary view generator
27 rendering unit
30 two-finger hand
40 suction hand
51 nut
52 T-tube
53 holder
54 capacitor
55 connector
56 holder
57 connector
60 circle
70 cylinder
80 rectangular prism
90 circle

The invention claimed is:

1. A setting assisting apparatus for assisting in setting a pose of a robot hand relative to a gripping target with the gripping target and the robot hand appearing on a screen, the apparatus comprising:
 a pose calculator configured to calculate the pose of the robot hand relative to the gripping target; and
 an auxiliary view generator configured to generate rendering information for rendering, in accordance with the pose of the robot hand relative to the gripping target, an auxiliary view in contact with the robot hand to aid in setting a pose of the robot hand relative to the gripping target appearing on the screen, the auxiliary view including an index indicating a distance and an angle between the gripping target and the robot hand,
 wherein the setting assisting apparatus assists in setting the pose of the robot hand relative to the gripping target by the aid of the auxiliary view, which is set according to a shape of the gripping target and rendered on the screen, and the gripping target itself appearing on the screen.

2. The setting assisting apparatus according to claim 1, wherein
 the auxiliary view generator updates the rendering information for rendering the auxiliary view in accordance with a change in the pose of the robot hand relative to the gripping target calculated by the pose calculator.

3. The setting assisting apparatus according to claim 1, wherein
 the auxiliary view generator receives a change in a pose of the auxiliary view relative to the robot hand.

4. The setting assisting apparatus according to claim 1, wherein
 the auxiliary view is rectangular prismatic.

5. The setting assisting apparatus according to claim 1, wherein
 the auxiliary view is cylindrical.

6. The setting assisting apparatus according to claim 1, wherein
 the auxiliary view is planar.

7. A setting assisting method for assisting in setting a pose of a robot hand relative to a gripping target with the gripping target and the robot hand appearing on a screen, the method comprising:
 calculating the pose of the robot hand relative to the gripping target; and
 generating rendering information for rendering, in accordance with the pose of the robot hand relative to the gripping target, an auxiliary view in contact with the robot hand to aid in setting a pose of the robot hand relative to the gripping target appearing on the screen, the auxiliary view including an index indicating a distance and an angle between the gripping target and the robot hand, wherein the setting assisting method assists in setting the pose of the robot hand relative to the gripping target by the aid of the auxiliary view, which is set according to a shape of the gripping target and rendered on the screen, and the gripping target itself appearing on the screen.

8. The setting assisting method according to claim 7, further comprising:

receiving a change in the pose of the robot hand relative to the gripping target, wherein calculating the pose includes calculating the pose of the robot hand relative to the gripping target based on the received change in the pose of the robot hand, and generating the rendering information includes updating the rendering information to reflect the pose calculated based on the received change in the pose of the robot hand.

9. The setting assisting method according to claim 7, further comprising:

receiving a change in a pose of the auxiliary view relative to the robot hand, wherein generating the rendering information includes generating the rendering information based on the received change in the pose of the auxiliary view.

10. The setting assisting method according to claim 7, wherein the auxiliary view is rectangular prismatic.

11. The setting assisting method according to claim 7, wherein the auxiliary view is cylindrical.

12. The setting assisting method according to claim 7, wherein the auxiliary view is planar.

13. A non-transitory computer readable medium storing a program for causing a computer to implement a setting assisting method for assisting in setting a pose of a robot hand relative to a gripping target with the gripping target and the robot hand appearing on a screen, the program causing the computer to perform operations comprising:

calculating the pose of the robot hand relative to the gripping target; and generating rendering information for rendering, in accordance with the pose of the robot hand relative to the gripping target, an auxiliary view in contact with the robot hand to aid in setting a pose of the robot hand relative to the gripping target appearing on the screen, the auxiliary view including an index indicating a distance and an angle between the gripping target and the robot hand, wherein the program for causing the computer to implement the setting assisting method assists in setting the pose of the robot hand relative to the gripping target by the aid of the auxiliary view, which is set according to a shape of the gripping target and rendered on the screen, and the gripping target itself appearing on the screen.

* * * * *